(12) United States Patent
Yang et al.

(10) Patent No.: US 9,723,004 B2
(45) Date of Patent: Aug. 1, 2017

(54) METHOD OF CONTROLLING ACCESS TO NETWORK DRIVE, AND NETWORK DRIVE SYSTEM

(71) Applicant: Facecon Co., Ltd., Guro-gu, Seoul (KR)

(72) Inventors: Giho Yang, Seoul (KR); Jaeyeob Hwang, Goyang-si (KR)

(73) Assignee: Facecon Co., Ltd. (KR)

( * ) Notice: Subject to any disclaimer, the term of this patent is extended or adjusted under 35 U.S.C. 154(b) by 0 days.

(21) Appl. No.: 14/435,152

(22) PCT Filed: Jul. 2, 2013

(86) PCT No.: PCT/KR2013/005856
§ 371 (c)(1),
(2) Date: Jun. 4, 2015

(87) PCT Pub. No.: WO2014/058130
PCT Pub. Date: Apr. 17, 2014

(65) Prior Publication Data
US 2015/0341359 A1    Nov. 26, 2015

(30) Foreign Application Priority Data

Oct. 12, 2012  (KR) .................. 10-2012-0113843
Jun. 28, 2013  (KR) .................. 10-2013-0075624

(51) Int. Cl.
G06F 21/62      (2013.01)
H04L 29/06      (2006.01)
H04W 4/02       (2009.01)

(52) U.S. Cl.
CPC .............. H04L 63/10 (2013.01); G06F 21/62 (2013.01); H04L 63/08 (2013.01); H04L 63/101 (2013.01);
(Continued)

(58) Field of Classification Search
CPC .... H04L 63/10; H04L 63/107; G06F 21/6218
See application file for complete search history.

(56) References Cited

U.S. PATENT DOCUMENTS

2003/0061350 A1   3/2003  Masuoka et al.
2005/0193199 A1*  9/2005  Asokan ................. H04L 63/062
                                                   713/168
(Continued)

FOREIGN PATENT DOCUMENTS

JP   2003-108519    4/2003
JP   2005-275480   10/2005
(Continued)

OTHER PUBLICATIONS

International Search Report for International Application No. PCT/KR2013/005856 dated Oct. 18, 2013, 13 pages, Republic of Korea.

*Primary Examiner* — David Pearson
(74) *Attorney, Agent, or Firm* — Thorpe North & Western

(57) ABSTRACT

A network drive system for controlling access to a network drive based on location information on a communication device according to the present technology includes: a storage unit storing a network drive that stores security data and general data; a receiving unit receiving a request for access to the network drive from a first communication device; a location checking unit checking whether the distance between the first communication device and a second communication device designated as a device for controlling access to the network drive is within a critical value; and a policy setting unit that applies a policy allowing the first communication device to access general data stored in the network drive or applies a policy disallowing the first communication device to access general data stored in the network drive, according to results of the determining by the location checking unit.

13 Claims, 6 Drawing Sheets

(52) U.S. Cl.
CPC .......... *H04L 63/107* (2013.01); *H04L 63/205* (2013.01); *H04W 4/021* (2013.01); *H04W 4/023* (2013.01); *G06F 2221/2111* (2013.01)

(56) References Cited

U.S. PATENT DOCUMENTS

| | | | |
|---|---|---|---|
| 2006/0117010 | A1 | 6/2006 | Hakala |
| 2007/0036359 | A1 | 2/2007 | Suzuki |
| 2007/0180257 | A1 | 8/2007 | Bae et al. |
| 2007/0185980 | A1 | 8/2007 | Abraham et al. |
| 2007/0299737 | A1* | 12/2007 | Plastina ............. G06Q 30/0207 705/14.1 |
| 2008/0098225 | A1 | 4/2008 | Baysinger |
| 2009/0070884 | A1 | 3/2009 | Wu et al. |
| 2010/0010998 | A1* | 1/2010 | Wagner ............... G06F 21/6209 707/E17.01 |
| 2010/0317323 | A1 | 12/2010 | Facemire et al. |
| 2011/0016534 | A1* | 1/2011 | Jakobsson ........... G06F 21/316 726/28 |
| 2011/0271114 | A1 | 11/2011 | Baysinger |
| 2012/0036354 | A1 | 2/2012 | Suzuki |
| 2012/0178419 | A1 | 7/2012 | Facemire et al. |
| 2012/0221639 | A1 | 8/2012 | Mallet et al. |
| 2013/0204849 | A1 | 8/2013 | Chacko |
| 2014/0068717 | A1* | 3/2014 | Mayes ..................... G06F 21/33 726/3 |

FOREIGN PATENT DOCUMENTS

| | | |
|---|---|---|
| JP | 2008-242644 | 10/2008 |
| JP | 2009-075688 | 4/2009 |
| JP | 2010-267198 | 11/2010 |
| JP | 2011-027917 | 2/2011 |
| KR | 2005-0015612 | 2/2005 |
| KR | 2005-0086051 | 8/2005 |
| KR | 100740682 | 7/2007 |
| KR | 2009-0052587 | 5/2009 |
| KR | 2010-0072018 | 6/2010 |
| KR | 2011-0007851 | 1/2011 |
| KR | 2012-0073799 | 7/2012 |
| WO | WO 2005-081115 | 9/2005 |
| WO | WO 2006-056881 | 6/2006 |
| WO | WO 2009-035991 | 3/2009 |
| WO | WO 2012-042509 | 4/2012 |
| WO | WO 2012-047273 | 4/2012 |

* cited by examiner

METHOD OF CONTROLLING ACCESS TO NETWORK DRIVE, AND NETWORK DRIVE SYSTEM

TECHNICAL FIELD

The present disclosure relates to a method of controlling access to a network drive, and more particularly, to a method of controlling access to a network drive based on location information of a plurality of communication devices and a network drive system.

BACKGROUND ART

A network drive recognizes a hard disk of other computer or a server connected on a local area network (LAN), an Internet and the like, as a drive connected to its computer, and a related art recognized a network drive over an internal network, while currently technology for providing a network drive service over an Internet is disclosed.

The network drive service is a service that allows to upload or download a file using a virtual storage (i.e., an Internet network drive) freely any time at a place where network communication is enabled. With the advancement of the network drive service, a service for synchronization between data on a local computer and data on a network drive is commercially available. Korean Patent Application Publication No. 10-2012-0073799 discloses a cloud storage-based data synchronizing and service providing apparatus.

However, because the network drive service loses attention from users when its usage method is much more inconvenient than a local drive, generally security is not very well taken care of That is, a traditional network drive service allows a user to freely access folders and files stored on a network drive if authentication of the corresponding user only succeeds. Thus, when other user steals an account of a particular user, data stored on a network drive of the particular user may be easily obtained from the outside.

SUMMARY

The present disclosure is directed to providing a method of controlling access to a network drive with improved security while not damaging the convenience in use and a network drive system.

These and other advantages of the present disclosure may be understood from the following detailed description and will become more fully apparent from the exemplary embodiments of the present disclosure. Also, it will be easily understood that the advantages of the present disclosure may be realized by the technology shown in the appended claims and combinations thereof.

A network drive system which controls access to a network drive based on location information of communication devices according to one aspect of the present disclosure includes a storage unit configured to store a network drive which stores security data and general data, a receiving unit configured to receive a request for access to the network drive from a first communication device, a location identification unit configured to determine if a distance between the first communication device and a second communication device designated as a device for controlling access to the network drive is within a critical distance, and a policy setting unit configured to apply a policy which allows the first communication device to access the general data stored on the network drive or a policy which blocks the first communication device from accessing the network drive, based on a result of the determination by the location identification unit.

Preferably, the network drive system may further include a security cancellation unit configured to receive a security cancellation list from the second communication device, cancel security of security data recorded in the security cancellation list among security data stored on the network drive, and allow the first communication device to access the security cancelled security data.

Also, the security cancellation unit may identify a list of the security data stored on the network drive, transmit the identified security data list to the second communication device, and receive, from the second communication device, the security cancellation list including security data selected by the second communication device from the security data list.

Preferably, the network drive system may further include an authentication unit configured to receive a security cancellation code from the second communication device and authenticate if the security cancellation code is valid.

More preferably, when the authentication succeeds, the security cancellation unit may cancel the security of security data.

Also, the network drive system may further include a data providing unit configured to display at least one of the general data stored on the network drive and the security cancelled security data on a search window of the first communication device.

Further, when the policy setting unit applies the policy which allows the first communication device to access the general data stored on the network drive, the location identification unit may continuously monitor locations of the first communication device and the second communication device, and when the distance between the first communication device and the second communication device exceeds the critical distance as a result of the monitoring, the policy setting unit may apply the policy which blocks the first communication device from accessing the network drive.

A method of controlling access to a network drive based on location information of communication devices according to another aspect of the present disclosure include receiving, by a network drive system, a request for access to a network drive from a first communication device, determining, by the network drive system, if a distance between the first communication device and a second communication device designated as a device for controlling access to the network drive is within a critical distance, and allowing, by the network drive system, the first communication device to access general data stored on the network drive of a user, when the distance of the first communication device and the second communication device is within the critical distance as a result of the determination.

Preferably, the method of controlling access to a network drive may further include receiving, by the network drive system, a security cancellation list from the second communication device, cancelling, by the network drive system, security of security data recorded in the security cancellation list among security data stored on the network drive, and allowing, by the network drive system, the first communication device to access the security cancelled data.

The present technology selectively allows access to a network drive based on location information of a plurality of communication devices, thereby providing an advantage of improving the security of data stored on the network drive and protecting the privacy of a user.

Also, the present technology enables a second communication device to control access to security data stored on the network drive to selectively allow a first communication device to access the security data by the control of the second communication device, thereby providing an advantage of further enhancing the security of precious data (that is, security data) of the user.

Moreover, when a distance between the first communication device and the second communication device exceeds a critical distance, the present disclosure determines that the user is away from the first communication device the user has been operating and blocks the first communication device from accessing the network drive, thereby providing a benefit of preventing other user from stealing data of the user while the user is absent.

Further, the present technology stores, on the network drive, data encrypted using an encryption key being stored in the second communication device and decrypts data downloaded from the network drive using a decryption key being stored in the second communication device, thereby further improving the security of the user data itself.

BRIEF DESCRIPTION OF THE DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawings.

DETAILED DESCRIPTION

The foregoing features and advantages will become apparent from the following detailed description with reference to the accompanying drawings, and accordingly, those skilled in the art will be able to easily practice the technical aspects of the present disclosure. Also, in the description of the present disclosure, when it is deemed that certain detailed description of known technology related to the present disclosure may unnecessarily obscure the essence of the disclosure, its detailed description is omitted herein. Hereinafter, an exemplary embodiment of the present disclosure is described in detail with reference to the accompanying drawings.

Unless otherwise defined, it should be understood that the use of the terms "comprises" and/or "comprising", or "includes" and/or "including" when used in this specification, specify the presence of stated elements, but do not preclude the presence or addition of one or more other elements. Also, the term " . . . unit" or "module" as used herein is intended to refer to a processing unit of at least one function or operation, either hardware, a combination of hardware and software, or software.

Figure 1:
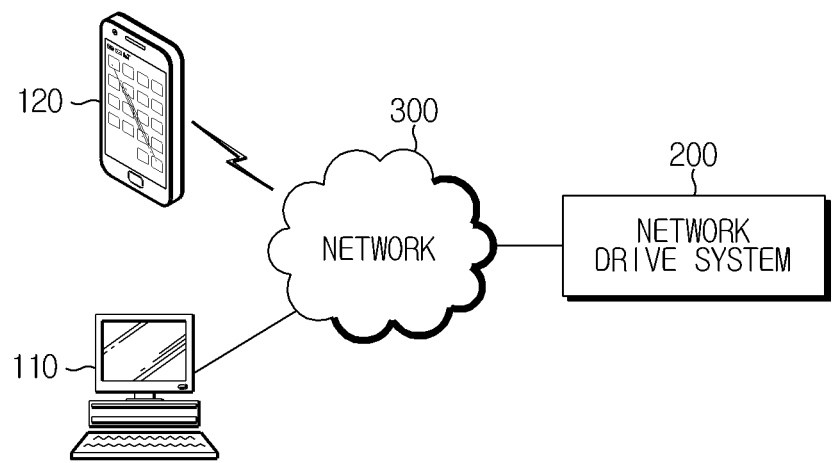
FIG. 1 is a diagram illustrating a network configuration to which a network drive system according to an exemplary embodiment of the present disclosure is applied.

FIG. 1 is a diagram illustrating a network configuration to which a network drive system according to an exemplary embodiment of the present disclosure is applied.

As shown in FIG. 1, the network drive system 200 according to the present disclosure communicates with a plurality of communication devices 110 and 120 over a network 300. The network 300 includes a mobile communication network, a wired Internet network, and a near field wireless communication network, and in the present disclosure, corresponds to known technology and its detailed description is omitted herein.

Hereinafter, the reference numeral 110 of FIG. 1 denotes a first communication device 110, and the reference numeral 120 of FIG. 1 denotes a second communication device 120. Assume that a same user owns the first communication device 110 and the second communication device 120.

The first communication device 110 is connected to the network drive system 200 over the network 300 to receive a network drive service. Particularly, the first communication device 110 is selectively allowed to access a user network drive based on a distance from the second communication device 120. Also, the first communication device 110 may periodically transmit its location information to the network drive system 200. That is, using a mounted global positioning system (GPS) receiver, the first communication device 110 may acquire GPS coordinates, and periodically transmit the GPS coordinates or administrative address information corresponding to the GPS coordinates as location information to network drive system 200. Also, if the first communication device 110 is a device having a near field wireless communication module (e.g., a wireless fidelity (WiFi) module) mounted therein, the first communication device 110 may acquire identification information of a neighbor small radio base station (e.g., an access point) accessible through the near field wireless communication module, and periodically transmit the identification information of the small radio base station as location information to the network drive system 200.

Furthermore, the first communication device 110 receives an encryption key from the second communication device 120, and encrypts a file intended to be uploaded based on the encryption key and uploads it to the network drive system 200. Also, the first communication device 110 receives a decryption key from the second communication device 120, and decrypts a file received from the network drive system 200 through the decryption key.

Although FIG. 1 illustrates the first communication device 110 as a desktop computer, the first communication device 110 may include, but is not limited to, any communication device that may be connected to the network drive system 200 over the network 300, such as a tablet computer, a laptop computer, and a mobile communication terminal.

The second communication device 120 performs a function of controlling access to security data set on the network drive. Specifically, when the first communication device 110 accesses the network drive of the user, the second communication device 120 performs a function of selectively allowing the first communication device 110 to access security data (i.e., security files/security folders) stored on the network drive. The second communication device 120 may periodically measure its location information and report it to the network drive system 200. Also, the second communication device 120 may store an encryption key and a decryption key, and provide at least one of the encryption key and the decryption key to the first communication device 110. The second communication device 120 is a tablet computer, a laptop computer, or a mobile communication terminal, preferably a smart phone.

The network drive system 200 is a system that provides a network drive service to the communication devices 110 and 120. The network drive service is also known as a web hard service or a cloud service.

The network drive system 200 stores network drives dedicated to users classified by accounts (i.e., IDs) of the users and user data stored on the network drives. In this instance, the network drive system 200 classifies and stores the user data into security data and general data, and stores data encrypted based on an encryption key for each user. The security data refers to files/folders set with security by the users' setting, and the general data refers to general files/folders set without security.

Particularly, when the network drive system 200 receives a request for network drive access from the first communication device 110, the network drive system 200 identifies the location of the first communication device 110 and the location of the second communication device 120 which controls access to security data, and determines if a distance between the first communication device 110 and the second communication device 120 exceeds a critical distance (e.g., 50 meters). When the distance between the first communication device 110 and the second communication device 120 is within the critical distance, the network drive system 200 allows access to general data by applying a restricted access policy and transmitting a list of general data (i.e., general files and general folders) stored on the network drive to the first communication device 110 in accordance with the policy. Also, when the second communication device 120 selects security data to cancel the security, the network drive system 200 allows the first communication device 110 to access the selected security data by displaying the selected security data on a screen of the first communication device 110.

In contrast, when the distance between the first communication device 110 and the second communication device 120 exceeds the critical distance, the network drive system 200 applies an access blocking policy and blocks the first communication device 110 from accessing the user dedicated network drive in accordance with the policy.

Figure 2:
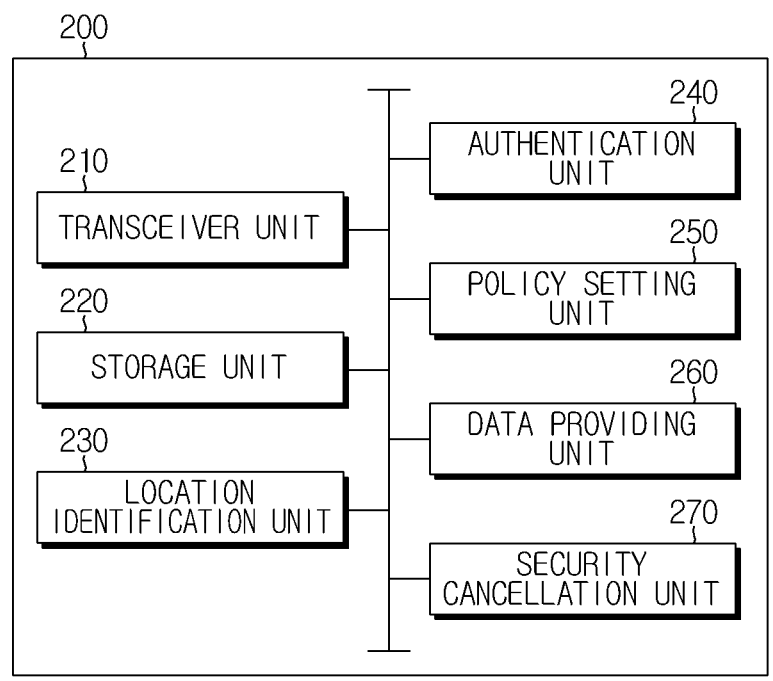
FIG. 2 is a diagram illustrating the architecture of a network drive system, according to an exemplary embodiment of the present disclosure.

FIG. 2 is a diagram illustrating the architecture of the network drive system, according to an exemplary embodiment of the present disclosure.

As shown in FIG. 2, the network drive system 200 according to an exemplary embodiment of the present disclosure includes a transceiver unit 210, a storage unit 220, a location identification unit 230, an authentication unit 240, a policy setting unit 250, a data providing unit 260, and a security cancellation unit 270.

The transceiver unit 210 performs a function of communicating with the communication devices 110 and 120 over the network 300. Particularly, the transceiver unit 210 periodically receives location information from the communication devices 110 and 120, and receives a network drive access request message from the first communication device 110. Furthermore, the transceiver unit 210 receives a security cancellation list from the second communication device 120.

The storage unit 220 corresponds to a storage means such as a database, and stores network drives classified by user IDs and user data (i.e., files/folders) stored on each of the network drives and encrypted. The user data is set as any one of security data and general data. That is, the user data is set as security data or general data based on the users' setting.

Also, the storage unit 220 stores login authentication information having an ID and a password recorded therein and a security cancellation code, classified by user. Furthermore, the storage unit 220 stores location information of the communication devices 110 and 120, and stores identification information of the communication device 120 for controlling access to security data for each user account. In the embodiment of the present disclosure, identification information of the second communication device 120 is stored in the storage unit 220 as identification information of a communication device for controlling access to security data. In this instance, as identification information of the communication devices 110 and 120, an Internet Protocol (IP) address, a media access control (MAC) address, or a phone number of the communication device may be recorded in the storage unit 220.

The location identification unit 230 performs a function of identifying a location of each of the first communication device 110 and the second communication device 120, and based on the identified locations, determining if a distance between the first communication device 110 and the second communication device 120 exceeds a critical distance. Furthermore, the location identification unit 230 transmits a result of the determination to the policy setting unit 250. Also, when the first communication device 110 accesses the network drive, the location identification unit 230 continues to monitor the locations of the first communication device 110 and the second communication device 120 to continuously determine if the distance between the first communication device 110 and the second communication device 120 is within the critical distance.

The authentication unit 240 performs login authentication of the user and security cancellation authentication of the user. Specifically, when the authentication unit 240 receives a network drive access request message from the first communication device 110 through the transceiver unit 210, the authentication unit 240 determines if an ID and a password included in the message are valid based on the login authentication information in the storage unit 220. Also, when the authentication unit 240 receives a security cancellation code from the second communication device 120, the authentication unit 240 authenticates if the security cancellation code is stored in the storage unit 220 as a security cancellation code of the user.

The policy setting unit 250 performs a function of establishing a security policy based on a result of the login authentication authenticated by the authentication unit 240 and a result of the determination by the location identification unit 230. That is, when the authentication unit 240 succeeds the login authentication of the first communication device 110 and a result of the determination received from the location identification unit 230 is within the critical distance, the policy setting unit 250 applies a network drive security policy of the user as a restricted access policy. Also, when the login authentication of the first communication device 110 succeeds and a result of the determination received from the location identification unit 230 exceeds the critical distance, the policy setting unit 250 applies a network drive security policy of the user as an access blocking policy.

The data providing unit 260 selectively allows access to the network drive of the user based on the policy applied by the policy setting unit 250. Specifically, when the policy setting unit 250 applies a restricted access policy, the data providing unit 260 identifies the user dedicated network drive in the storage unit 220 based on the login ID of the first communication device 110, and transmits a general data list including information of multiple pieces of general data (i.e., general files/general folders) set without security on the network drive to the first communication device 110, to display it on a network drive search window of the first communication device 110, so restricted access is allowed to the network drive. In this instance, the data providing unit 260 may record, in the general data list, a name, a size, and a date of correction of each file or folder as the information of the general data. Also, when the policy setting unit 250 applies an access blocking policy, the data providing unit 260 does not provide data stored on the network drive to the first communication device and blocks the first communication device 110 from accessing the user dedicated network drive.

Also, the data providing unit 260 allows the first communication device 110 to access at least one of the multiple pieces of security data according to instructions of the security cancellation unit 270. In this instance, the data providing unit 260 transmits, to the first communication device 110, information (i.e., a size, a date of correction, and a name) of security data (i.e., security files/security folders) to cancel the security in response to receiving the instructions from the security cancellation unit 270, to output the information of the security data to the network drive search window of the first communication device 110. Moreover, the data providing unit 260 transmits data requested for download to the first communication device 110, and stores data uploaded from the first communication device 110 on the network drive of the storage unit 220.

The security cancellation unit 270 performs a function of selectively allowing the communication device to access security data. Specifically, when the security cancellation unit 270 receives a security cancellation request message from the first communication device 110 having accessed the network drive, the security cancellation unit 270 identifies a list of data set with security (i.e., a list of security files and a list of security folders) on the user dedicated network drive. Also, the security cancellation unit 270 transmits the list of data set with security to the second communication device 120 for controlling access to security data. Furthermore, when the security cancellation unit 270 receives a security cancellation list from the second communication device 120, the security cancellation unit 270 cancels the security of data (i.e., files/folders) corresponding to the security cancellation list, and instructs the data providing unit 260 to allow the first communication device 110 to access the cancelled security data.

Figure 3:
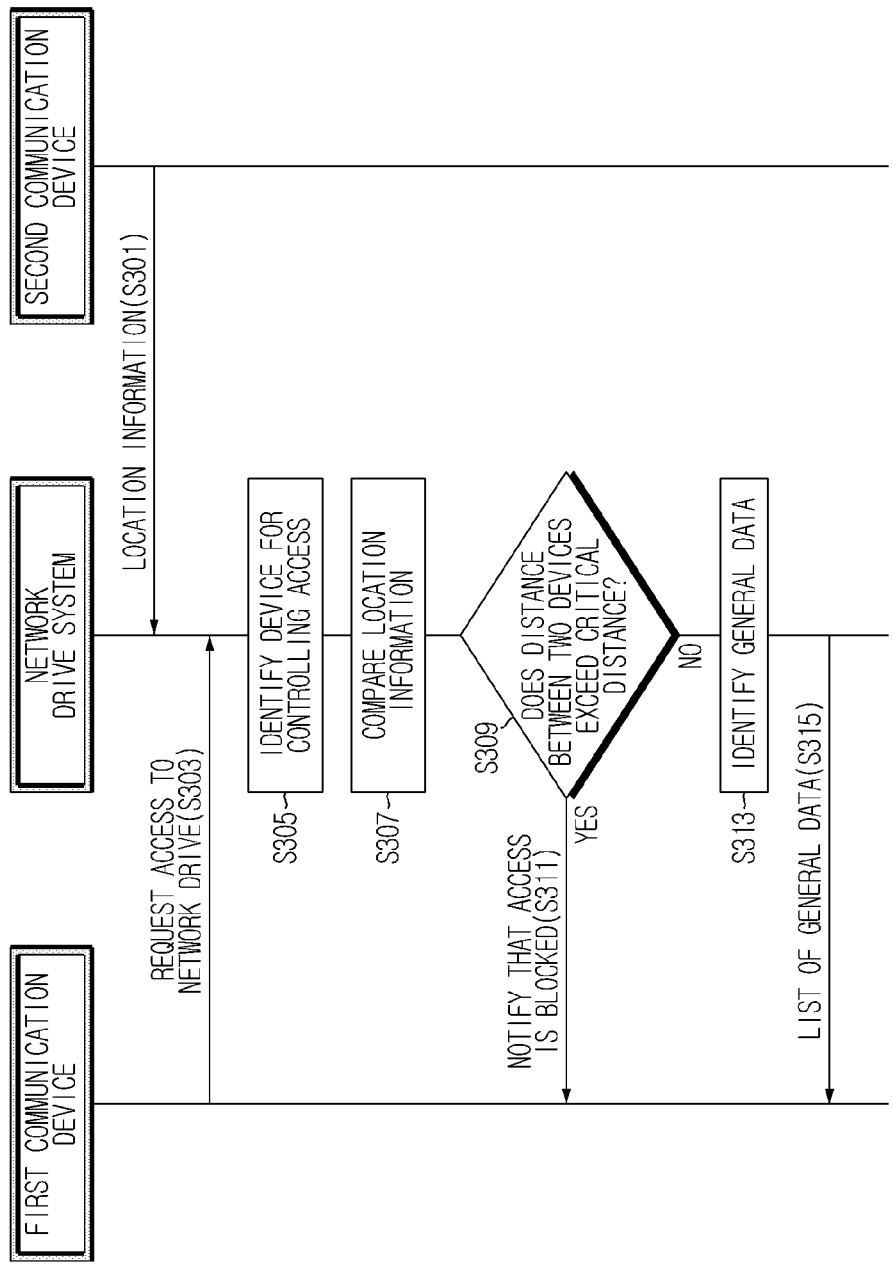
FIG. 3 is a flowchart illustrating a method of allowing restricted access to a network drive based on location information of communication devices in a network drive system, according to an exemplary embodiment of the present disclosure.

FIG. 3 is a flowchart illustrating a method of allowing restricted access to the network drive based on location information of the communication devices in the network drive system, according to an exemplary embodiment of the present disclosure.

Referring to FIG. 3, the transceiver unit 210 of the network drive system 200 periodically receives location information from the second communication device 120, and the location identification unit 230 stores the location information of the second communication device 120 in the storage unit 220 (S301). In this instance, when the location information of the second communication device 120 is already stored in the storage unit 220, the location identification unit 230 updates the location information of the second communication device 120 stored in the storage unit 220 using the received location information, to keep the latest location information of the second communication device 120.

Subsequently, the transceiver unit 210 of the network drive system 200 receives a network drive access request message including login ID and password of the user from the first communication device 110 (S303). In this instance, location information of the first communication device 110 may be included in the network drive access request message.

Then, the authentication unit 240 of the network drive system 200 authenticates if the login ID and password included in the network drive access request message are valid based on login authentication information of the storage unit 220, and when the authentication fails, transmits using a login failure message to the first communication device 110 using the transceiver unit 210. In contrast, when the authentication of the login ID and password succeeds, the authentication unit 240 requests the location identification unit 230 to identify the location.

Subsequently, the location identification unit 230 identifies a communication device for controlling access to security data stored on the user dedicated network drive as the second communication device 120 based on the login account of the first communication device 110 (S305). That is, the location identification unit 230 identifies that identification information of a communication device registered as a device for controlling access corresponding to the login ID is identification information of the second communication device 120.

Subsequently, the location identification unit 230 identifies the location information of the second communication device 120 in the storage unit 220, and identifies the location information of the first communication device 110 as well. In this instance, when the first communication device 110 is a stationary communication device incapable of mobile communication, the location identification unit 230 may identify pre-stored location information of the first communication device 110 in the storage unit 220. Also, when the first communication device 110 is a mobile communication device capable of mobile communication, the location identification unit 230 may identify the location information of the first communication device 110 based on the location information included in the network drive access request message.

Subsequently, the location identification unit 230 compares the identified location of the first communication device 110 to the location of the second communication device 120 and calculates a distance between the two communication devices (S307), and determines if the distance between the first communication device 110 and the second communication device 120 exceeds a critical distance (e.g., 50 m) (S309). In this instance, when GPS coordinates are recorded in the location information of the first communication device 110 and the second communication device 120, the location identification unit 230 may calculate the distance between the two devices by analyzing each of the GPS coordinates. Also, when the location information of the first communication device 110 and the second communication device 120 is identification information of a small radio base station, the location identification unit 230 may calculate the distance between the two devices by identifying location information mapped to the identification information of the small radio base station in a location information mapping table stored therein or stored in an external server. Also, when the location information of the first communication device 110 and the second communication device 120 is identification information of a small radio base station and the identification information of the small radio base stations recorded in the location information of the two devices is identical, the location identification unit 230 may determine that the distance between the two devices 110 and 120 is within the critical distance.

Subsequently, the location identification unit 230 transmits a result of the determination to the policy setting unit 250. Then, when the received result of the determination exceeds the critical distance, the policy setting unit 250 applies a security policy of the user dedicated network drive as an access blocking policy. Also, the data providing unit 260 transmits a message notifying that access to the network drive is blocked to the first communication device 110 using the transceiver unit 210, and blocks the first communication device 110 from accessing the user dedicated network drive (S311).

In contrast, when a result of the determination received from the location identification unit 230 is within the critical distance, the policy setting unit 250 applies a security policy of the user dedicated network drive as a restricted access policy, and instructs the data providing unit 260 to provide general data to the first communication device 110. Then, the data providing unit 260 accesses the user dedicated network drive based on the login ID of the first communication device 110, and identifies multiple pieces of general data set without security on the network drive (S313).

Subsequently, the data providing unit 260 transmits a general data list including information (e.g., a size, a name, and a date of correction) of each pieces of general data (e.g., general files/general folders) to the first communication device 110, to display information associated with files/folders set as the general data on a network drive search window of the first communication device 110 (S315).

Thus, the user of the first communication device 110 may access the files or folders set as the general data, and modify or download the general files or general folders.

After the second communication device 120 acquires the location of the first communication device 110 through communication with the first communication device 110 and identifies its location information as well, the second communication device 120 may determine if the distance from the first communication device 110 exceeds the critical distance, and transmit a result of the determination to the network drive system 200. In this case, when the first communication device 110 is a stationary terminal, the second communication device 120 pre-stores location information of the first communication device 110 mapped to identification information of the first communication device 110, and when identification information is received from the first communication device 110, identifies location information mapped to the identification information in the stored data. Furthermore, the second communication device 120 may identify its location information using a GPS receiver, compare its location information to the location of the first communication device 110, and determine if the distance from the first communication device 110 exceeds the critical distance. Also, the second communication device 120 may receive location information of the first communication device 110 measured by the first communication device 110, compare the location information of the first communication device 110 to its location information, and determine if the distance from the first communication device 110 exceeds the critical distance. Then, the location identification unit 230 of the network drive system 200 receives a result of determining the locations from the second communication device 120 through the transceiver unit 210, and determines if the distance between the first communication device 110 and the second communication device 120 exceeds the critical distance based on the result of the determination.

In this instance, the network drive system may selectively allow the first communication device 110 to access security data by the control of the second communication device 120.

Figure 4:
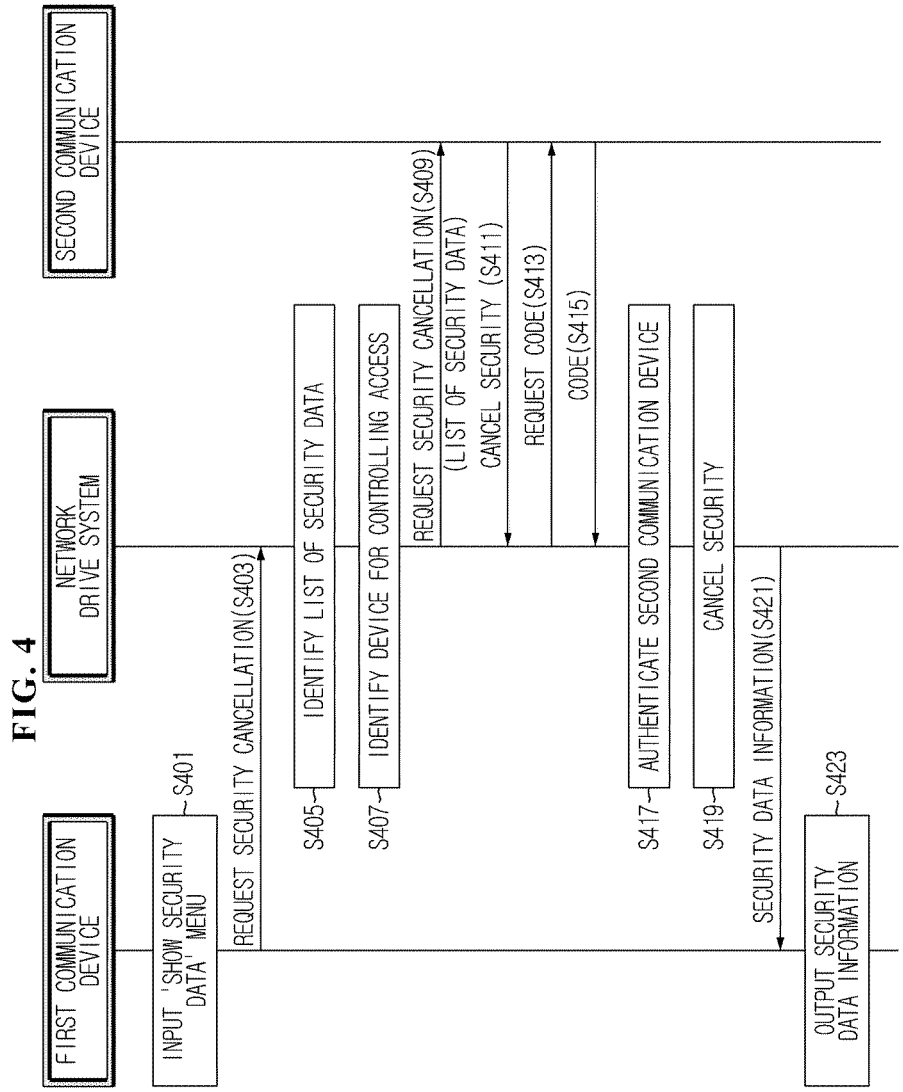
FIG. 4 is a flowchart illustrating a method of displaying security cancelled data to a communication device in a network drive system, according to an exemplary embodiment of the present disclosure.

FIG. 4 is a flowchart illustrating a method of displaying security cancelled data to the communication device in the network drive system, according to an exemplary embodiment of the present disclosure.

Referring to FIG. 4, the first communication device 110 displaying general data on the network drive search window receives an input of a 'show security data' menu from the user (S401). That is, the user of the first communication device 110 clicks a 'show security data' menu among network drive service menus to identify security files and security folders not displayed on the network drive search window.

Then, the first communication device 110 transmits a security cancellation request message to the network drive system 200, and the transceiver unit 210 of the network drive system 200 receives the security cancellation request message (S403).

Subsequently, the security cancellation unit 270 identifies the user dedicated network drive in the storage unit 220 based on a user ID used for the first communication device 110 to log in, and identifies a list of data set with security (i.e., a list of security files and a list of security folders) on the network drive (S405).

Also, the security cancellation unit 270 identifies that a communication device for controlling access to security data stored on the network drive is the second communication device 120 based on the login account of the first communication device 110 (S407). Subsequently, the security cancellation unit 270 transmits the security cancellation request message including the list of data set with security to the identified second communication device 120 using the transceiver unit 210 (S409).

Subsequently, the second communication device 120 outputs the security data list included in the security cancellation request message to a screen, and when the second communication device 120 receives, from the user, a selection of at least one pieces of security data from the security data (i.e., security files or security folders) listed in the security data list, the second communication device 120 generates a security cancellation list including the at least one piece of security data selected. Also, the second communication device 120 transmits a security cancellation message including the generated security cancellation list to the network drive system 200 (S411).

Then, the transceiver unit 210 of the network drive system 200 receives the security cancellation message, and the security cancellation unit 270 instructs the authentication unit 240 to authenticate the second communication device 120. Subsequently, the authentication unit 240 transmits a message requesting a security cancellation code to the second communication device 120 using the transceiver unit 210 (S413). Subsequently, the second communication device 120 inputs security cancellation code from user, and transmits the security cancellation code to the network drive system 200 (S415).

Then, the authentication unit 240 of the network drive system 200 receives the security cancellation code from the second communication device 120 through the transceiver unit 210, and authenticates if the second communication device 120 is a communication device having a justifiable security cancellation authority by determining if the code matches a security cancellation code of the user stored in the storage unit 220 (S417).

Subsequently, when the security cancellation authentication of the second communication device 120 fails, the authentication unit 240 transmits a message notifying that security cancellation is impossible to the first communication device 110, and in contrast, when the security cancellation authentication succeeds, the authentication unit 240 instructs the security cancellation unit 270 to cancel the security data.

Then, the security cancellation unit 270 identifies the security cancellation list included in the security cancellation message received at S411, and cancels the security of the at least one piece of security data (i.e., security files/security folders) corresponding to the security cancellation list (S419), and instructs the data providing unit 260 to allow the first communication device 110 to access the security data.

Then, the data providing unit 260 allows access to the security data by identifying information associated with the security data included in the security cancellation list on the user dedicated network drive stored in the storage unit 220, and transmitting the identified security data information (i.e., a name, a size, and a date of correction) to the first communication device 110 (S421). Then, the first communication device 110 outputs the security data information (information of security files/security folders) to the network drive search window (S423). Thus, the user of the first communication device 110 may access the security cancelled files/folders through the second communication device 120, and modify, delete, or download the corresponding files or folders.

When the first communication device 110 logs out, the security cancellation unit 270 preferably re-sets security for the security cancelled data at S419.

The network drive system 200 may cancel security of at least one piece of security data in response to a request from the second communication device 120 without a process of inputting a 'show security data' menu from the first communication device 110. That is, when the network drive system 200 directly receives a request for security cancellation of at least one piece of security data from the second communication device 120, the network drive system 200 instructs the authentication unit 240 to authenticate the second communication device 120, when the authentication unit 240 succeeds the authentication of the second communication device 120, cancels security of the at least one piece of security data (i.e., security files/security folders) requested for security cancellation, and instructs the data providing unit 260 to allow the first communication device 110 to access the security data.

Figure 5:
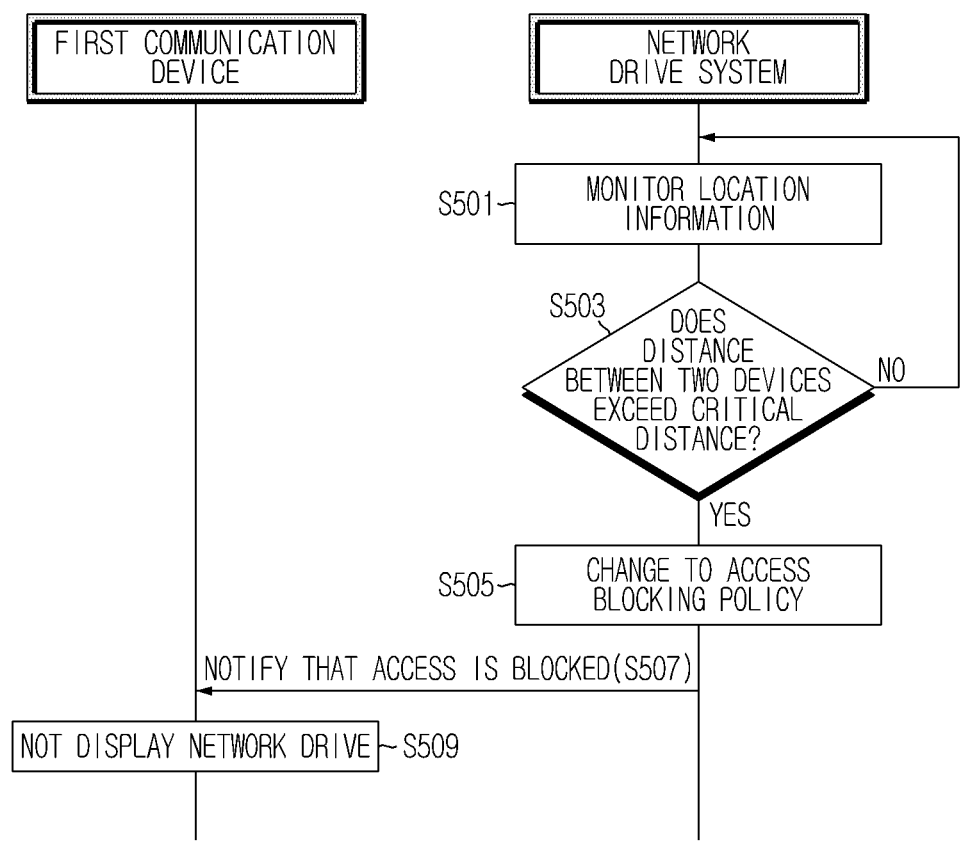
FIG. 5 is a flowchart illustrating a method of changing a security policy when a distance between communication devices in a network drive system exceeds a critical distance, according to an exemplary embodiment of the present disclosure.

FIG. 5 is a flowchart illustrating a method of changing the security policy when the distance between the communication devices in the network drive system exceeds the critical distance, according to an exemplary embodiment of the present disclosure.

Referring to FIG. 5, when the data providing unit 260 of the network drive system provides a list of general data to the first communication device 110, the location identification unit 230 continuously monitors the location of the second communication device 120 based on location information periodically received from the second communication device 120 (S501). Preferably, when the first communication device 110 is a mobile communication device capable of mobile communication, the location identification unit 230 may also monitor location information of the first communication device 110 by periodically receiving location information from the first communication device 110.

Subsequently, the location identification unit 230 determines if the distance between the first communication device 110 and the second communication device 120 is continuously within the critical distance based on the monitored location information (S503), and when the distance is within the critical distance, proceeds with S501 again.

In contrast, as a result of the determination, when the distance between the first communication device 110 and the second communication device 120 exceeds the critical distance, the location identification unit 230 transmits a user move-out signal to the policy setting unit 250.

Then, the policy setting unit 250 determines that the second communication device 120 is away from a place where the first communication device 110 is disposed, and changes the policy from a restricted access policy being currently set to an access blocking policy (S505). That is, when the policy setting unit 250 receives the user move-out signal from the location identification unit 230, the policy setting unit 250 determines that the user moved from the location of the first communication device 110 the user has been operating to other place for a while, and changes the security policy from a restricted access policy to an access blocking policy.

Subsequently, the data providing unit 260 recognizes that the access blocking policy is set by the policy setting unit 250, blocks the first communication device 110 from accessing the network drive in accordance with the policy, and transmits a message notifying that access to the network drive is blocked to the first communication device 110 (S507). Preferably, the data providing unit 260 includes a data non-display command in the message, to remove information of all data displayed on the network drive search window of the first communication device 110 (S509).

In contrast, when the distance between the second communication device 120 and the first communication device 110 is measured to be within the critical distance again, the location identification unit 230 of the network drive system 200 transmits a user move-in signal to the policy setting unit 250 again. Then, the policy setting unit 250 changes from the access blocking policy to a restricted access policy, and the data providing unit 260 allows the first communication device 110 to access general data among the data included in the user dedicated network drive.

In another embodiment, the second communication device 120 may continuously measure the distance from the first communication device 110, and when the distance from the first communication device 110 exceeds the critical distance, may transmit a critical distance excess signal to the network drive system 200. Specifically, when the first communication device 110 accesses the network drive, the second communication device 120 continuously monitors the location of the first communication device 110 and its location to continuously determine if the distance from the first communication device 110 exceeds the critical distance, and when the distance exceeds the critical distance, transmits a critical distance excess signal to the network drive system 200. Then, in response to receiving the critical distance excess signal through the transceiver unit 210, the location identification unit 230 of the network drive system 200 recognizes that the distance between the first communication device 110 and the second communication device 120 exceeds the critical distance, and transmits a user move-out signal to the policy setting unit 250. Then, the policy setting unit 250 changes the policy from a restricted access policy to an access blocking policy, and the data providing unit 260 recognizes that the access blocking policy is set by the policy setting unit 250, and blocks the first communication device 110 from accessing the network drive in accordance with the policy.

Figure 6:
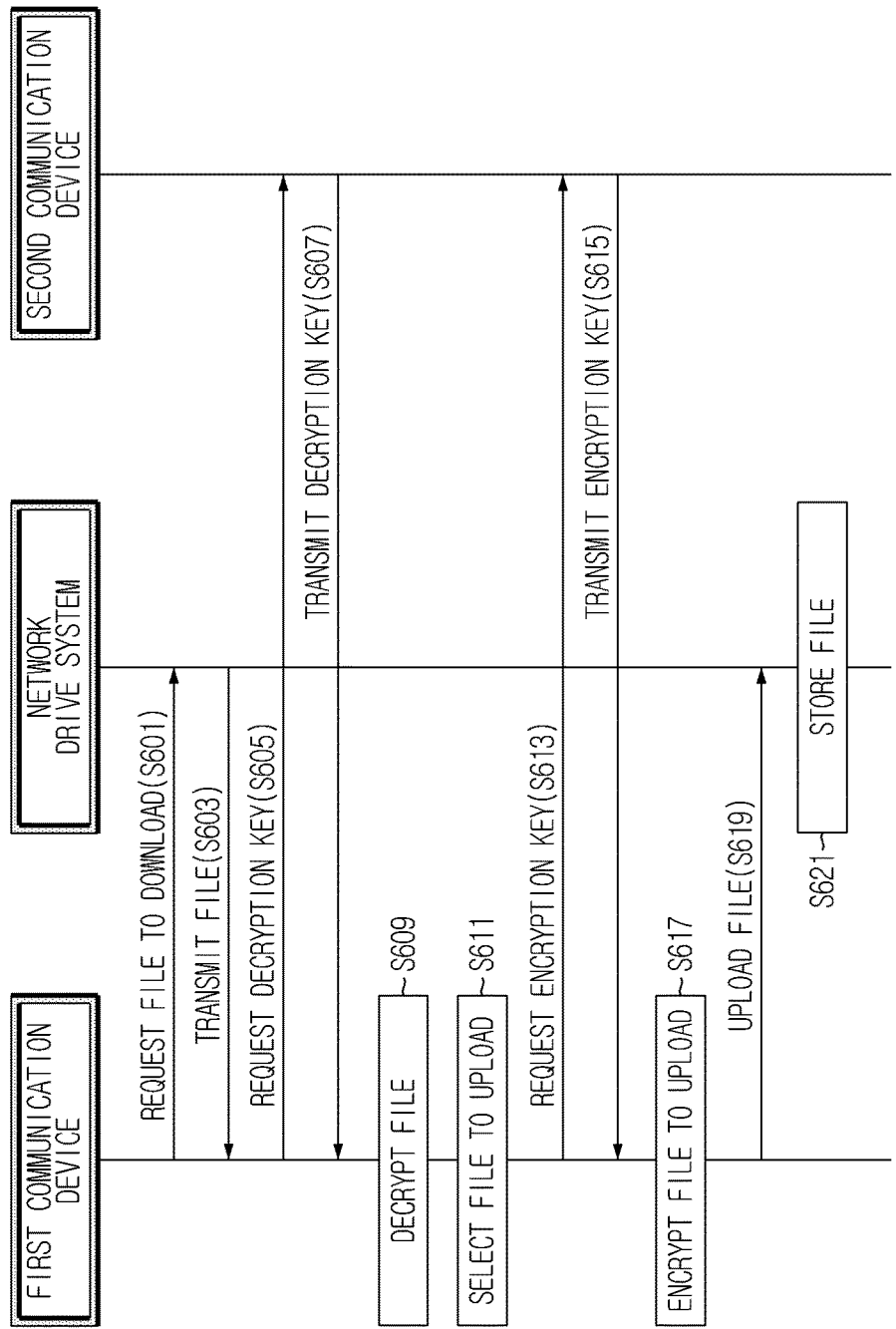
FIG. 6 is a flowchart illustrating a method of processing a downloaded file or an uploaded file in a communication device, according to an exemplary embodiment of the present disclosure.

FIG. 6 is a flowchart illustrating a method of processing a downloaded file or an uploaded file in the communication device, according to an exemplary embodiment of the present disclosure.

Referring to FIG. 6, when the first communication device 110 receives an input of a download input signal for at least one file displayed on the network drive search window from the user, the first communication device 110 requests the download of the selected at least one file to the network drive system 200 (S601).

Then, the data providing unit 260 of the network drive system 200 extracts the at least one file requested from the first communication device 110 from the network drive of the storage unit 220, and transmits the file to the first communication device 110 using the transceiver unit 210 (S603).

Subsequently, the first communication device 110 requests a decryption key to the second communication device 120 designated as a device for controlling access to the network drive, and receives a decryption key stored in the second communication device 120 from the second communication device 120 (S605, S607). Subsequently, the first communication device 110 decrypts a file downloaded from the network drive system 200 using the received decryption key (S609).

Also, the first communication device 110 may receive a selection of a file to be uploaded to the network drive form the user (S611). Then, the first communication device 110 requests an encryption key to the second communication device 120 (S613). Subsequently, the second communication device 120 transmits an encryption key being stored therein to the first communication device 110 (S615).

Then, the first communication device 110 encrypts the file to be upload using the received encryption key (S617), and transmits the encrypted file to the network drive system 200 (S619). Subsequently, the data providing unit 260 of the network drive system 200 stores the encrypted file received from the first communication device 110 on the network drive of the user (S621).

As described above, the network drive system 200 according to the present disclosure selectively allows access to the network drive based on the location information of the plurality of communication devices 110 and 120, thereby improving the security of data stored on the network drive and protecting the privacy of the user. Particularly, the present disclosure enables the second communication device 120 to control access to the security data stored on the network drive to selectively allow the first communication device 110 to access the security data by the control of the second communication device 120, thereby further enhancing the security of precious data (that is, security data) of the user.

Furthermore, when the distance between the first communication device 110 and the second communication device 120 exceeds the critical distance, the network drive system 200 according to the present disclosure determines that the user is away from the first communication device 110 the user has been operating and blocks the first communication device 110 from accessing the network drive, thereby preventing other user from stealing data of the user through the first communication device 110 while the user is absent. Further, the present disclosure enables the first communication device 110 to store, on the network drive, data encrypted using the encryption key being stored in the second communication device 120 and decrypt data downloaded from the network drive using the decryption key being stored in the second communication device 120, so even if other user steals a file on the network drive, he or she cannot read the content contained in the file, thereby further improving the security of the user data.

While this specification contains many features, the features should not be construed as limitations on the scope of the disclosure or of the appended claims. Certain features described in the context of separate exemplary embodiments can also be implemented in combination in a single exemplary embodiment. Conversely, various features described in the context of a single exemplary embodiment can also be implemented in multiple exemplary embodiments separately or in any suitable sub combination.

Although the drawings describe the operations in a specific order, one should not interpret that the operations are performed in a specific order as shown in the drawings or successively performed in a continuous order, or all the operations are performed to obtain a desired result. Multitasking or parallel processing may be advantageous under a particular environment. Also, it should be understood that all exemplary embodiments do not require the distinction of various system components made in the above mentioned embodiment. The program components and systems may be generally implemented as a single software product or multiple software product packages.

The above mentioned method of the present disclosure may be implemented as program instructions and recorded in non-transitory computer-readable media (such as, for example, a compact disk-read only memory (CD ROM), random access memory (RAM), read-only memory (ROM), floppy disks, hard disks, magneto-optical disks, and the like). This process may be easily performed by person having ordinary skill in the technical field to which the present disclosure belongs, and its detailed description is omitted herein.

It should be noted various substitutions, modifications, and changes may be made to the present disclosure by person having ordinary skill in the technical field to which the present disclosure belongs without departing from the spirit and scope of the present disclosure, and the present disclosure is not limited by the above described embodiments and the accompanying drawings.

What is claimed is:

1. A network drive system which controls access to a network drive based on location information of communication devices, the network drive system comprising:
   a storage unit configured to store a network drive which stores security data and general data;
   a receiving unit configured to receive a request for access to the network drive from a first communication device;
   a location identification unit configured to determine if a distance between the first communication device and a second communication device designated as a device for controlling access to the network drive is within a critical distance;
   a policy setting unit configured to apply a policy which allows the first communication device to access the general data stored on the network drive or a policy which blocks the first communication device from accessing the network drive, based on a result of the determination by the location identification unit;

a data providing unit configured to transmit a list of the general data stored on the network drive to the first communication device when the distance between the first communication device and the second communication device is determined to be within the critical distance and the policy which allows the first communication device to access the general data is applied; and a security cancellation unit configured to identify, when the policy which allows the first communication device to access the general data is applied, a list of the security data stored on the network drive and transmit the identified list of security data to the second communication device, wherein when a security cancellation list recording security data selected from the list of security data is received from the second communication device, the security cancellation unit cancels security of security data recorded in the security cancellation list among the security data stored on the network drive to allow the first communication device to access the security cancelled security data, and the data providing unit transmits information associated with the security cancelled security data to the first communication device when the first communication device is allowed to access the security cancelled security data.

2. The network drive system according to claim 1, wherein the security cancellation unit transmits the list of security data to the second communication device when a security cancellation request is received from the first communication device having received the list of general data.

3. The network drive system according to claim 2, wherein the security cancellation unit receives the security cancellation request from the first communication device when a user clicks a show security data menu on a network drive search window of the first communication device displaying the list of general data.

4. The network drive system according to claim 2, further comprising:

an authentication unit configured to receive a security cancellation code from the second communication device and authenticate if the security cancellation code is valid, wherein the security cancellation unit cancels the security of the security data when the authentication succeeds.

5. The network drive system according to claim 1, wherein the location identification unit continuously monitors locations of the first communication device and the second communication device when the policy setting unit applies the policy which allows the first communication device to access the general data stored on the network drive, and when the distance between the first communication device and the second communication device exceeds the critical distance as a result of the monitoring, the policy setting unit applies the policy which blocks the first communication device from accessing the network drive.

6. The network drive system according to claim 1, further comprising:

an authentication unit configured to receive login information of a user from the first communication device requesting access to the network drive and perform login authentication wherein the policy setting unit applies the policy which allows the first communication device to access the general data when the login authentication succeeds and the distance between the first communication device and the second communication device is determined to be within the critical distance.

7. A method of controlling access to a network drive based on location information of communication devices, the method comprising:

receiving, by a network drive system, a request for access to a network drive from a first communication device;

determining, by the network drive system, if a distance between the first communication device and a second communication device designated as a device for controlling access to the network drive is within a critical distance;

allowing, by the network drive system, the first communication device to access general data among security data and the general data stored on the network drive of a user, when the distance of the first communication device and the second communication device is within the critical distance as a result of the determination;

transmitting, by the network drive system, a list of the general data stored on the network drive to the first communication device when the first communication device is allowed to access the general data;

identifying, by the network drive system, a list of the security data stored on the network drive and transmitting the identified list of security data to the second communication device when the first communication device is allowed to access the general data;

cancelling, by the network drive system, when a security cancellation list recording security data selected from the list of security data is received from the second communication device, security of security data recorded in the security cancellation list among the security data stored on the network drive and allowing the first communication device to access the security cancelled security data; and transmitting, by the network drive system, information associated with the security cancelled security data to the first communication device when the first communication device is allowed to access the security cancelled security data.

8. The method of controlling access to a network drive according to claim 7, wherein the transmitting of the list of security data to the second communication device comprises:

receiving, by the network drive system, a security cancellation request from the first communication device having received the list of general data; and transmitting the list of security data to the second communication device in response to the security cancellation request.

9. The method of controlling access to a network drive according to claim 8, wherein the receiving of a security cancellation list comprises receiving the security cancellation request from the first communication device when a user clicks a show security data menu on a network drive search window of the first communication device displaying the list of general data.

10. The method of controlling access to a network drive system according to claim 7, further comprising:

after transmitting the list of general data or the information associated with the security cancelled security data to the first communication device, receiving, by the first communication device, an encryption key from the second communication device, encrypting data using the encryption key, and uploading the encrypted data to the network drive.

11. The method of controlling access to a network drive according to claim 7, wherein the method comprises, after transmitting the list of general data or the information associated with the security cancelled security data to the first communication device, receiving, by the first communication device, receiving a decryption key from the second communication device, downloads data stored on the network drive, and decrypts the downloaded data using the decryption key.

12. The method of controlling access to a network drive according to claim 7, wherein the allowing the first communication device to access to the general data comprises:

receiving, by the network drive system, login information of a user from the first communication device requesting access to the network drive and performing login authentication; and allowing, by the network drive system, the first communication device to access the general data when the login authentication succeeds and the distance between the first communication device and the second communication device is within the critical distance.

13. The method of controlling access to a network drive according to claim 7, wherein the allowing the first communication device to access the security cancelled security data comprises:

receiving, by the network drive system, a security cancellation code from the second communication device transmitting the security cancellation list, and authenticating if the security cancellation code is valid; and cancelling, by the network drive system, security of security data recorded in the security cancellation list when the authentication succeeds.

* * * * *